United States Patent
Chen et al.

(10) Patent No.: US 10,909,487 B2
(45) Date of Patent: Feb. 2, 2021

(54) WORKFLOW CUSTOMIZATION

(71) Applicant: HEWLETT PACKARD ENTERPRISE DEVELOPMENT LP, Houston, TX (US)

(72) Inventors: Rotem Chen, Yehud (IL); Yoni Roit, Yehud (IL); Hava Babay Adi, Yehud (IL); Yifat Felder, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 374 days.

(21) Appl. No.: 15/329,022

(22) PCT Filed: Aug. 28, 2014

(86) PCT No.: PCT/US2014/053236
§ 371 (c)(1),
(2) Date: Jan. 25, 2017

(87) PCT Pub. No.: WO2016/032496
PCT Pub. Date: Mar. 3, 2016

(65) Prior Publication Data
US 2017/0213176 A1    Jul. 27, 2017

(51) Int. Cl.
*G06Q 10/06* (2012.01)
*G06F 9/448* (2018.01)

(52) U.S. Cl.
CPC ....... *G06Q 10/06316* (2013.01); *G06Q 10/06* (2013.01); *G06Q 10/067* (2013.01); *G06F 9/4498* (2018.02)

(58) Field of Classification Search
CPC .................. G06Q 10/06316; G06Q 10/0633
See application file for complete search history.

(56) References Cited

U.S. PATENT DOCUMENTS

| | | | |
|---|---|---|---|
| 7,403,948 B2 | 7/2008 | Ghoneimy et al. | |
| 7,711,694 B2 | 5/2010 | Moore | |
| 8,521,758 B2 | 8/2013 | Nachnani et al. | |
| 2003/0033191 A1 | 2/2003 | Davies et al. | |
| 2003/0217127 A1 | 11/2003 | Sinn | |
| 2003/0217264 A1* | 11/2003 | Martin | G06F 21/6209 713/156 |
| 2004/0003353 A1* | 1/2004 | Rivera | G06Q 10/10 715/237 |
| 2004/0098284 A1* | 5/2004 | Petito | G06Q 50/167 705/316 |

(Continued)

OTHER PUBLICATIONS

Gregor Joeris et al, Managing Evolving Workflow Specifications, 3rd IFCIS International Conference on Cooperative Information Systems (CoopIS'98), New York, Aug. 1998, pp. 310-319 (Year: 1998).*

(Continued)

*Primary Examiner* — Andre D Boyce

(57) ABSTRACT

In one implementation, a workflow system can include a storage engine and a merger engine. The storage engine maintains a restricted workflow part on a first storage resource and maintains a customizable workflow part on a second storage resource. The merger engine retrieves the restricted workflow part based on the product version and merge the restricted workflow part with the customizable workflow part associated with the restricted workflow part.

21 Claims, 4 Drawing Sheets

(56) References Cited

U.S. PATENT DOCUMENTS

| | | | | |
|---|---|---|---|---|
| 2005/0043982 | A1* | 2/2005 | Nguyen | G06Q 10/06316 705/7.26 |
| 2005/0102249 | A1* | 5/2005 | Bigus | G06N 5/04 706/47 |
| 2005/0177406 | A1* | 8/2005 | Facciorusso | G06Q 10/063 705/7.11 |
| 2006/0074734 | A1* | 4/2006 | Shukla | G06F 8/10 717/107 |
| 2006/0101034 | A1 | 5/2006 | Murphy et al. | |
| 2006/0294506 | A1 | 12/2006 | Dengler et al. | |
| 2007/0094199 | A1* | 4/2007 | Deshpande | G06N 5/025 706/47 |
| 2007/0094306 | A1 | 4/2007 | Kyriazakos | |
| 2007/0150329 | A1* | 6/2007 | Brook | G06Q 10/063118 705/7.13 |
| 2007/0220065 | A1* | 9/2007 | Coyle | G06F 16/284 |
| 2011/0161284 | A1 | 6/2011 | Tewari et al. | |
| 2012/0278786 | A1* | 11/2012 | Ruiz | G06Q 10/06 717/102 |
| 2012/0278873 | A1 | 11/2012 | Calero et al. | |
| 2013/0090963 | A1* | 4/2013 | Sharma | G06Q 10/063112 705/7.13 |
| 2014/0129550 | A1 | 5/2014 | Weatherhead | |
| 2015/0012141 | A1* | 1/2015 | Schulz | G05B 11/01 700/275 |
| 2015/0370878 | A1* | 12/2015 | Caruana | H04L 67/1095 726/11 |

OTHER PUBLICATIONS

European Patent Office, Extended European Search Report for Appl. No. 14900382.4 dated Jan. 24, 2018 (8 pages).

International Search Report & Written Opinion received in PCT Application No. PCT/US2014/053236, dated Apr. 28, 2015, 9 pages.

Salley, M., "Developing Workflows in SharePoint 2013, Office 365 and SharePoint Online," (Web Page), May 30, 2014, 4 pages, available at https://www.linkedin.com/today/post/article/20140530181022-17468776-developing-workflows-in-sharepoint-2013-office-365-and-sharepoint-online.

* cited by examiner

WORKFLOW CUSTOMIZATION

BACKGROUND

A process can be managed by creating a workflow to accomplish the tasks of the process. A workflow is a representation of a state machine that holds the information on valid states for each related entity and how to transform between those states. For example, a workflow can represent the activities (e.g. phases) and relationships (e.g. transitions) between the activities of a process to fulfill an offering, such as a request for support or a request for service.

DETAILED DESCRIPTION

In the following description and figures some example implementaions workflow systems and/or methods of workflow customization are described. A workflow can be managed via a product. As used herein, a "workflow product" represents an application of executable instructions that maintain a workflow when the executable instructions are executed on circuitry, such as a processor resource. A workflow product can include the capability to allow a user to customize a workflow. For example, a product can include business logic associated with service desk of related entities with a workflow for each class of entity. Business logic represents instructions (e.g. a data lecture and/or function) to produce a workflow part. An entity class is based on the type of management process to happen in the workflow and can depend on how the management process is modeled. Example entity types (i.e. classes) include a request entity, a change entity, and an incident entity. Each entity class can be associated with a workflow structure based on business logic. For example, a request entity may have a first default workflow structure while a change entity may have a second default workflow structure that is different from the first default workflow structure. The customer may want to customize parts of the workflow. For example, the tasks of the workflow may be altered to process the workflow based on a corporate policy. However, customer customizations can interfere with upgrades to the product. Thus, either the customer may not upgrade the product or the customer's customization may be removed upon upgrading.

Various examples described below relate to separating a workflow into layers. By separating a workflow into layers, the parts of the workflow that are upgraded with the product can be updated without affecting the layer of customization provided by the user. For example, a first read-only layer can include states and rules that are required by a workflow to complete execution of an offering and a second customizable layer can include rules that are customizable and/or designate where customization can be made to the workflow. In that example, a user can receive a list of rules associated with a set of states where the list includes rules from the read-only layer and the customization layer. In this manner, the product for managing workflows can be upgraded and avoid conflicts of merging customizations into a new product upgrade.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, modify, and/or language."

Figure 1:
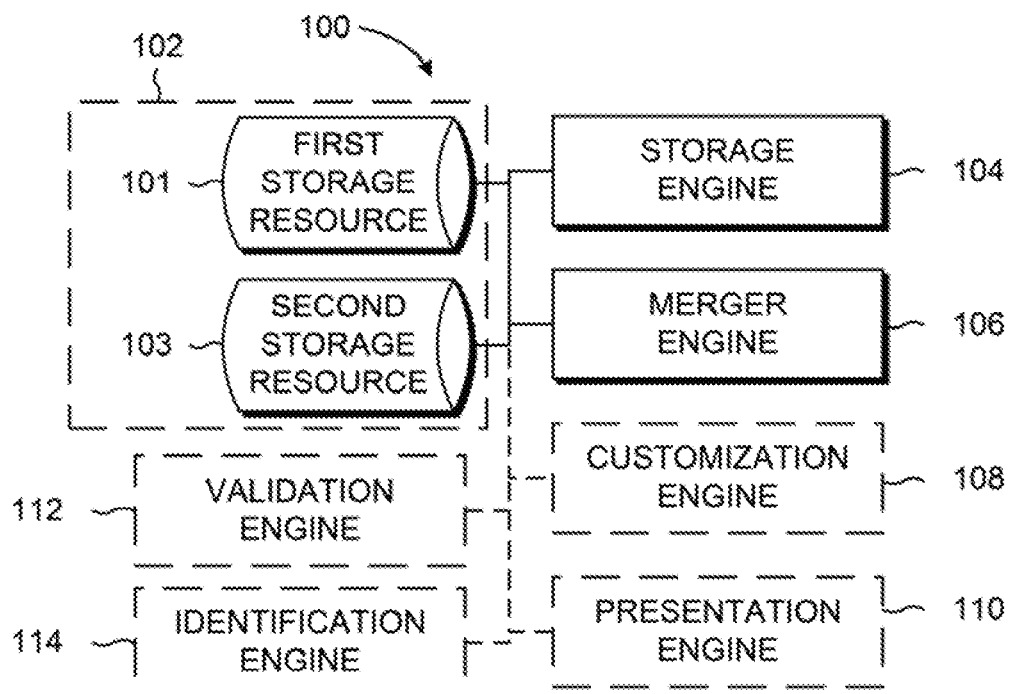
FIGS. 1 and 2 are block diagrams depicting example workflow systems consistent with disclosed examples.
Figure 2:
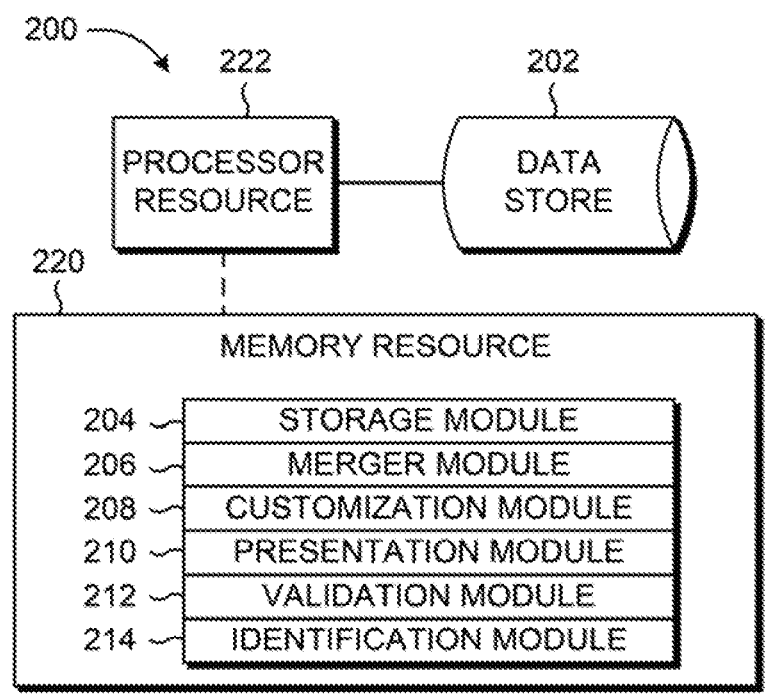

FIGS. 1 and 2 are block diagrams depicting example workflow systems consistent with disclosed examples. Referring to FIG. 1, the example workflow system 100 of FIG. 1 generally includes a data store 102, a storage engine 104, and a merger engine 106. In general, the data store 182 can include multiple resources, such as a first storage resource 101 and a second storage resource 103, which are maintained by the storage engine 104 to include a first set of workflow parts and a second set of workflow parts to merge into a workflow using the merge engine 106. The example workflow system can include a customization engine 108, a presentation engine 110, a alien engine 112, and an identification engine 114. In general, the customization engine 108 can facilitate customization of the workflow presented via the presentation engine 110 when the customizable rules are validated by the validation engine 112 for use in the product version identified by the identification engine 114.

The storage engine 104 represents any circuitry or combination of circuitry and executable instructions to maintain parts of the workflow on a plurality of storage resources. For example, the storage engine 104 can represent a combination of circuitry and executable instructions to maintain a first workflow part on a first storage resource and maintain a second workflow part on a second storage resource. Example parts of a workflow include a phase (i.e. a task of the process), a metaphase (i.e. a classification of tasks), a state, a rule, a transition, a condition, and a combination thereof. For example, a workflow part can be a set of states or a set of workflow rules. A rule is an action to take during a phase. For example, a phase may include performance of a first set of actions based on satisfying a condition and perform a second set of actions when the condition is not satisfied. Example workflow rules include action rules, validation rules, rendering rules, and cascading rules.

The storage engine 104 can divide or otherwise organize the storage medium to separate the parts of the workflow that are customizable and the parts of the workflow that are non-customizable. The workflow parts can be divided among storage resources based on workflow layer. For example, the restricted workflow rules can be stored in the first storage resource while the customized rules (e.g. entity specific rules) can be stored in the second storage resource. The first and second storage resources may be located on different storage mediums, different nodes of the same storage medium, different ranges of locations in memory, other combination of physical and/or virtual storage resources. The storage engine 104 can utilize various storage methods. For example, the business rules can be organized in the form of a file system and the customizable rules can be maintained in a database. The restricted parts and the customizable parts can be kept in a similar or the same data structure to facilitate combining the restricted parts and the customizable parts into a single workflow. The parts of the workflow can be organized based on order of the parts. For example, a first set of rules can be located at a first location designated for the beginning of the list, a second set of rules can be located at a second location designated for the middle of the list, and a third set of rules can be located at a third location designated for the end of the list. The storage engine 104 can restrict changes to the workflow to be saved in the location designated for customization.

The storage engine 104 may utilize flags to determine which parts are to be organized with each storage resource. For example, a first storage resource can be separated from a second storage resource to contain a first set of rules that are flagged different from the second set of rules. Examples of layer separation discussed herein includes separating workflow parts based on customization, workflow part, and order of execution. Customizability of a part, such as a rule, can be determined based on the purpose of the part. For example, a plurality of flags can be set to identify that a plurality of business rules are to be restricted from customization because the business rules are foundational for the workflow, while a plurality of default tenant rules are flagged to be allowed to be customized because the default rules can be made specific to the customer rather than the system. For another example, a rule may be determined as a restricted business rule because the rule is associated with a server functionality of a server to execute the workflow or an application function of an application associated with the workflow, such as application to perform a task of the workflow. A business rule can be part of or derivable from a set of business logic to establish the workflow process. For example, the business logic can comprise the rules to be restricted from customization. For another example, the business logic can include the restricted business rules, the default customizable rules, and logic to maintain limitations on customization of the business rules, the customizable rules, and the order of the rules.

A storage resource can contain data shareable with a plurality of tenants and the read-only rules can include a set of business rules based on a product version. For example, a storage resource can be a community storage resource having a plurality of business rules organized based on the version of the workflow management product. In that example, a business rule that is compatible with the product versions can be retrieved when a request for a workflow derives from that product. For another example, a storage resource can contain multiple sets of business rules where each set is flagged as associated with a product version being offered to a tenant of a multi-tenant system. In this manner, only relevant rules are to be selected based on the product version (e.g. only the rules that are directed to that particular product version are retrieved for the tenant based on the tenant's version of the product). The storage engine 104 can designate the location of the rules based on the restrictions on the workflow part and or the product version for which the workflow part is compatible.

The merger engine 106 represents any circuitry or combination of circuitry and executable instructions to combine the parts located within the resources that are associated with the workflow. For example, the merger engine 106 can represent a combination of circuitry and executable instructions to retrieve the restricted workflow part based on the product version associated with a platform to maintain the workflow and merge the restricted workflow part with the customizable workflow part associated with the restricted workflow part. The merger engine 106 can include circuitry or a combination of circuitry and executable instructions to retrieve a workflow part from a resource location. The merger engine 106 can include multiple retrieval functionalities managed by constraint logic. For example, the merger engine 106 can retrieve multiple lists (e.g., multiple files of ordered rules) and order them based on logic of the system 100 (e.g., business logic and/or constraint logic). For another example, upon creation of a workflow, the merger engine 106 retrieves the read-only parts of the selected workflow from a file system and retrieves the customizable parts of the selected workflow from a database of customizable rules where the database is managed with a scheme to restrict access to a database node based on the customer identity. For yet another example, the constraint logic of the merger engine 106 can initiate a first retrieval request for read-only rules for the beginning of a list of rules, a second retrieval request for customizable rules, and a third retrieval request for read-only rules for the end of the list of rules, where each set of rules is designated at a location identifiable via the storage engine 104. The constraint logic can include instructions ordering the retrieval requests in the order of operation of the workflow parts. For example, a read-only workflow transition can be retrieved for an associated customizable workflow state based on a mapping of transitions to phases. The logic of the system 100 can be predefined based to create an ordered workflow and predefine relevance of workflow parts. For example, the business logic can predefine an order of retrievals where the first retrieval designates the rules as being first in a list, a second retrieval designates the rules being second in a list, a third retrieval designates the rules to be third in a list, and so on. The logic of the system 100 can be predefined to retrieve read-only rules prior to retrieving customizable rules. The workflow parts can be of same data structure type to ensure compatibility for merger.

The merger engine 106 can work in conjunction with the storage engine 104 to retrieve the workflow parts from the resources. For example, the merger engine 106 can request the location of the rules associated with a product version and retrieve the workflow part from the storage resource at the designated location based on the designated location. For another example, the merger engine 106 can request the storage engine 104 to retrieve the workflow parts based on the product version and tenant making the request, and once all the parts are received the merger engine 106 can combine the parts into a workflow to be presented to the requesting tenant. A plurality of customizable rules can be identified as relevant to (e.g. associated with) a plurality of business rules. In this manner, a user can select a workflow and receive restricted business rules, and default customizable rules to fulfill an offering and utilize the customization engine 108 to customize the workflow to the desires of the user. The user can be presented with a prepopulated workflow containing read-only parts and customizable parts.

The merger engine 106 can utilize constraint logic to combine the parts of the workflow. For example, the workflow may be identified based on a business policy for fulfilling an offering where the business policy establishes particular procedures to complete the tasks for fulfilling an offering. The constraint logic represents instructions to restrict customization of the list, such as a data structure and/or a function. For example, the constraint logic can place limitations on the order of execution of the rules and/or limitations on customization of particular rules, such as business rules. The constraint logic can be any appropriate representation of a policy for executing a workflow. For example, the constraint logic can include a hierarchical data structure of phases with a list of rules associated with each phase and methods to transition between each phase. The merger engine 106 can place the plurality of rules in an order, such as the restricted workflow rules first and the customizable rules second. For example, the constraint logic can include a plurality of ordered rule sets (such as a linked list of rules) where each rule set includes a flag to denote customization status of the rule and a link to the next rule. For another example, the constraint logic can include a stored set of rules in an ordered list including a plurality of customizable rules and a plurality of business rules in a predetermined order. The constraint logic can limit the customization of the workflow. For example, the constraint logic can determine what sections of rules are allowed to be reordered. For another example, the constraint logic can establish that a user can customize the middle of the rule set of a phase, but cannot edit the business rules before or after the customizable rule section. The constraint logic can be in the form of a data structure, a flag, or a function to ensure the user is kept within the customization limits allowable without affecting the ability to upgrade or otherwise change to a different version of the workflow management product.

The customization engine 108 represents any circuitry or combination of circuitry and executable instructions to facilitate customization of the customizable workflow part. For example, the customization engine 108 can cause a window with editable text of a customizable workflow rule to present to the user. For another example, the customization engine 108 can work in conjunction with the storage engine 104 to modify and update rules based on user input and/or system input. The customization engine 108 can represent any circuitry or combination of circuitry and executable instructions to restrain customization of workflow parts having a restricted status. For example, the customization engine 108 can disable modifications to read-only business rules to ensure upgrade of the business rules does not affect a workflow.

The presentation engine 110 represents any circuitry or combination of circuitry and executable instructions to cause an identifier to present to identify the status of customization associated with the workflow part. For example, the presentation engine 110 can cause a first identifier to present to identify the customizable workflow part is customizable and cause a second identifier to present to identify the restricted workflow part is restricted from customization. An identifier can be any appropriate symbolic designation such as an icon, a picture, a color, a string, a text style, or a number. For example, the presentation engine 110 can cause the rules of a phase to be presented in a list and cause either a lock icon to be presented for rules that are read-only or an edit icon to be presented for rules that are customizable. The presentation engine 110 can cause a plurality of rules to be presented in a list. For example, when a phase is selected, a plurality of customizable rules for that phase can be presented in a list between a first set of business rules and a second set of business rules. In that example, the results of the retrievals by the merger engine 106 can be cached at the user interface level to present the list.

The validation engine 114 represents any circuitry or combination of circuitry and executable instructions to validate parts of the workflow. For example, the validation engine 112 can represent a combination of circuitry and executable instructions to validate a restriction workflow part is free of customization and validate a customizable workflow part is mergeable with the restricted workflow part (e.g. the customized part is compatible with the product version). The validation engine 112 can be used to ensure the workflow parts that are customizable are compatible with product versions of the read-only rules. Thus, a product can be upgraded to improved workflow parts to allow the program to function as well as allow customization of some rules. The validation engine 112 can validate the restricted workflow part and the customizable workflow part are ordered based on the constraint logic. For example, a set of read-only rules can be placed at the beginning of a phase and the end of the phase to ensure the transitions between phases happens correctly, while allowing a user to customize rules during the phase (e.g. in between the beginning set of read-only rules and the end set of read-only rules).

The identification engine 114 represents any circuitry or combination of circuitry and executable instructions to identify a version of a workflow product. The product version can be identified based on metadata of an offering request, a profile associated with a tenant, or a retrieval function to verify the product version to be used by the tenant.

The data store 102 can contain information utilized by the engines 104, 106, 108, 110, 112, and 114. For example, the data store 102 can store workflow parts (such as a workflow rule), an identifier, storage resource locations, etc. The data store 102 represents a storage medium that can include multiple storage resources, such as a first storage resource 101 and a second storage resource 103. As mentioned above, the storage resources can be separate nodes of a storage resource, separated mediums of a distributed data store, or other appropriate data storage method for organizing multiple set of data.

FIG. 2 depicts are example workflow system 200. As shown in FIG. 2, system 200 comprises a memory resource 220 operatively coupled to a processor resource 222. The processor resource 222 can be operatively coupled to a data store 202. In some examples, the data store 202 can be the same as the data store 102 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a storage module 204, a merger mule 206, a customization module 208, a presentation module 210, a validation module 212, and an identification module 214. The storage module 204, the merger module 206, the customization module 208, the presentation module 210, the validation module 212, and the identification module 214 represent program instructions that when executed function as the storage engine 104, the merger engine 106, the customization engine 108, the presentation engine 110, the validation engine 112, and the identification engine 114 of FIG. 1, respectively. The processor resource 222 can carry out the modules 204, 206, 208, 210, 212, 214 and/or any other appropriate operations among and/or associated with the modules of the system 200. For example, the processor resource 222 can carry out a set of instructions to identify a version of a workflow management product, retrieve a first workflow part layer having a plurality of business rules of the workflow associated with the version, retrieve a second workflow part layer having a plurality of customizable rules associated with the business rules, and merge the plurality of business rules and the plurality of customizable rules into a list based on constraint logic. For another example, the processor resource 222 can carry out a set of instructions to identify a product version, upgrade the workflow to a set of business rules based on a selected product upgrade, validate the plurality of customizable rules are compatible with the set of business rules associated with the upgraded version of the product, and place the plurality of business rules and the plurality of customizable rules in an order based on constraint logic.

Figure 4:
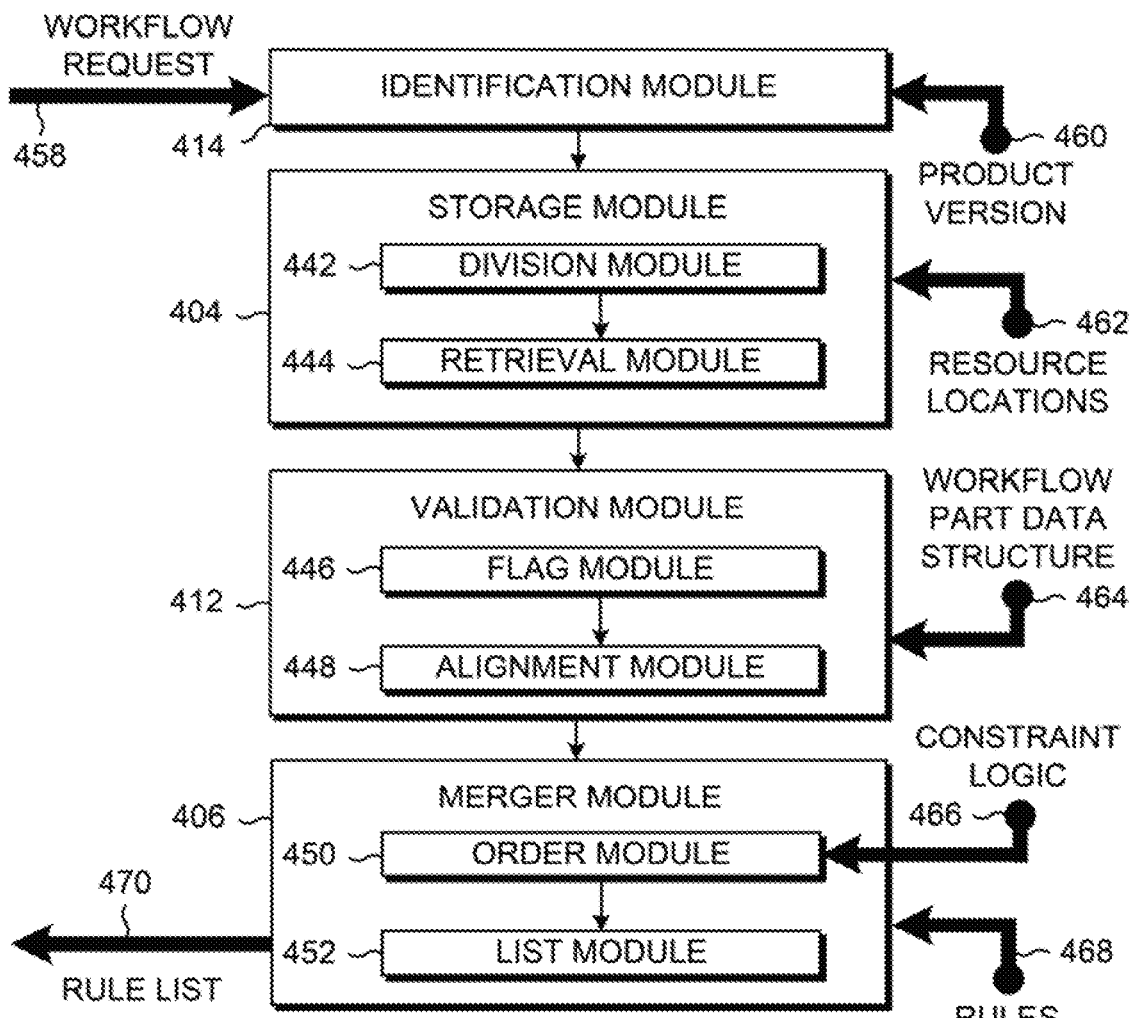
FIG. 4 depicts example modules consistent with disclosed example workflow stets.

Although these particular modules and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 4 depicts yet another example of how functionality can be organized into modules.

The processor resource 222 can be any appropriate circuitry capable of processing (e.g. computing) instructions, such as one or multiple processing elements capable of retrieving instructions from the memory resource 220 and executing those instructions. For example, the processor resource 222 can be at least one central processing unit ("CPU") that enables workflow customization by fetching, decoding, and executing modules 204, 206, 208, 210, 212, and 214. Example processor resources 222 include at least one CPU, a semiconductor-based microprocessor, an application specific integrated circuit ("ASC"), a field-programmable gate array ("FPGA"), and the like. The processor resource 222 can include multiple processing elements that are integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e. storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 can be distributed across devices. The memory resource 220 and the data'store 202 can represent the same physical medium or separate physical mediums. The data of the data store 202 can include representations of data and/or information mentioned herein.

In the discussion herein, the engines 104, 106, 108, 110, 112, and 114 of FIG. 1 and the modules 204, 206, 208, 210, 212, and 214 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In some examples, the system 200 can include executable instructions that are part of an installation package that when installed can be executed by the processor resource 222 to perform a method of the system 200. In these examples, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM") flash memory, or the like. The memory resource 220 can include integrated memory such as a hard drive ("HD"), a solid state drive ("SD"), or an optical drive.

Figure 3:
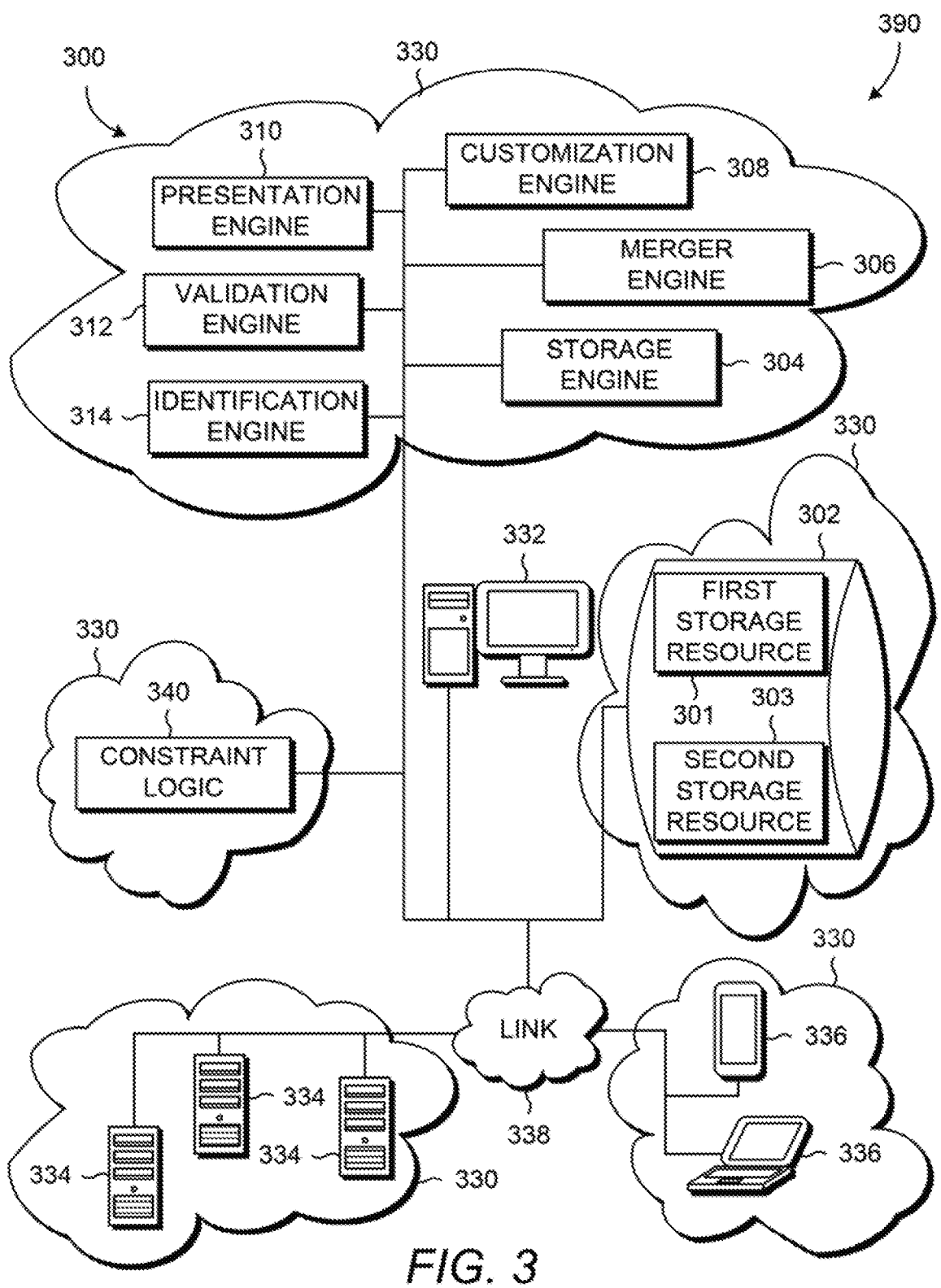
FIG. 3 depicts an example environment in which various workflow systems can be implemented consistent with disclosed examples.

FIG. 3 depicts an example environment 390 in which various example workflow systems can be implemented consistent with disclosed examples. The example environment 390 is shown to include an example system 300 for maintaining a workflow. System 300 (described herein with respect to FIGS. 1 and 2) can represent generally any circuitry or combination of circuitry and executable instructions to maintain a workflow based on layers of workflow parts. System 300 can include a storage engine 304, a merger engine 306, a customization engine 308, a presentation engine 310, a validation engine 312, and an identification engine 314 that are the same as the storage engine 104, the merger engine 106, the customization engine 108, the presentation engine 110, the validation engine 112, and the identification engine 114 of FIG. 1, respectively, and the associated descriptions are not repeated for brevity. As shown in FIG. 3, the engines 304, 306, 308, <310, 312, and 314 can be integrated into a compute device, such as a service device 334. The engines 304, 306, 308, 310, 312, and 314 can be integrated via circuitry or as installed instructions into a memory resource of the compute device.

The example environment 390 can include compute devices, such as administrator devices 332, service devices 334, and user devices 336. A first set of instructions can be provided and/or modified on an administrator device 332 to offer a workflow. For example, a workflow management application can be used to develop and/or modify a workflow on an administrator device 332 and stored onto a web server, such as a service device 334. For another example, the administrator device 332 can be used to associate constraint logic 340 with the workflow management product and designate the data store 302 as the location to store parts of the workflow, where the data store 302 is the same as the data store 102 of FIG. 1 (e.g. having a first storage resource 301 and a second storage resource 303). The service devices 334 represent generally any compute devices to respond to a network request received from a user device 336, whether virtual or real. For example, the service device 334 can operate a combination of circuitry and executable instructions to provide a network packet in response to a request for a page or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices can be located on separate networks 330 or part of the same network 330. The example environment 390 can include any appropriate number of networks 330 and any number of the networks 330 can include a cloud compute environment. A cloud compute environment may include a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, 110, 112, and 114 of FIG. 1 and/or the modules 204, 206, 208, 210, 212, and 214 of FIG. 2 can be distributed across devices 332, 334, 336, or a combination thereof. The engine and/or modules can complete or assist completion of operations performed in describing another engine and/or module. For example, the merger engine 306 of FIG. 3 request, complete, or perform the methods or operations described with the merger engine 106 of FIG. 1 as well as the storage engine 104, the customization engine 108, the validation engine 110, and the identification engine 114 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some examples, the engines of the system 300 can perform example methods described in connection with FIGS. 4-7.

FIG. 4 depicts example modules consistent with disclosed example workflow systems. Referring to FIG. 4, the example modules of FIG. 4 generally include an identification module 414, a storage module 404, a validation module 412, and a merger module 406. The example modules of FIG. 4 can be implemented on a service device, such as service device 334 of FIG. 3.

A workflow request 458 can be received by the workflow system and cause a processor resource executing the identification module 414 to identify the product version 460. For example, a version retrieval function can be executed or a system profile can be analyzed. Based on the product version, the storage module 404 can cause the processor resource to retrieve the workflow parts of the workflow. For example, the read-only rules of the workflow can be retrieved from a file system associated with the workflow management product. The storage module 404 can include program instructions, such as the division module 442 and retrieval module 444, to facilitate retrieval of the workflow parts at the resource locations 462. The division module 442 represents executable instructions that when executed cause the processor resource to identify the location of rules associated with the product version based on the organization of the storage resource. For example, the read-only rules can be maintained in a file system (where the file system can be updateable) and the customizable rules can be maintained in a centrally-located database. The retrieval module 444 represents executable instructions that when executed cause the processor resource to retrieve workflow parts associated with the designated location identified by the division module 444. For example, the retrieval module 444 can receive a location argument and retrieve data (e.g., a workflow part) at the specified location.

The validation module 412 can cause the processor resource to validate the workflow parts retrieved by the storage module. The workflow parts can be received in a workflow part data structure 464 and analyzed based on constraint logic. For example, the validation module 412 can include program instructions, such as a flag module 446 and an alignment module 448, that cause a processor to identify whether a rule is validly customizable based on a flag and whether the customizable workflow parts are aligned with the non-customizable parts in a manner to enable a merger of the customizable parts and the non-customizable. Once the parts are verified by processor resource causing the validation module, the parts can be merged into a workflow by processor resource via executing the merger engine 406. The merger engine 406 can cause the processor resource to receive the constraint logic 466 and the rules 468 stored at the resource locations 462 associated with the workflow. The merger module 406 can include program instructions, such as an order module 450 and a list module 452, that cause a processor resource to combine the rules 468 in an order designated by the constraint logic 466. For example, the order of the rules can be identified based on the constraint logic 466 via execution of the order module 450, and a rule list 470 for a phase can be produced by the processor resource when executing a list module 462 where the rule 470 includes the read-only rules and the customizable rules in the proper order to allow for the workflow to execute properly. The order module 450 can receive constraint logic that orders the retrievals of the data in the order to execute the workflow. By maintaining the rules in a separate locations based on customizability, workflow part (e.g. workflow part class), and order, the merger module 450 can provide an appropriately ordered list by retrieving the rules in an order designated by the constraint logic. In this manner, a rule list 470 can be built in a predetermined order to facilitate execution of the workflow (e.g., because, read-only rules for initiating a phase of a workflow can be designated as retrieved first while the read-only rules for exiting a phase can be designated as retrieved last). The rule list 470 can be caused to be presented to a user for customization and/or caused to be executed. When a user makes a change, such as adding a rule, the rule can be flagged as restricted or customizable and stored at the appropriate location so that upon later retrieval, the added rule is retrieved in the appropriate order of the list.

Figure 5:
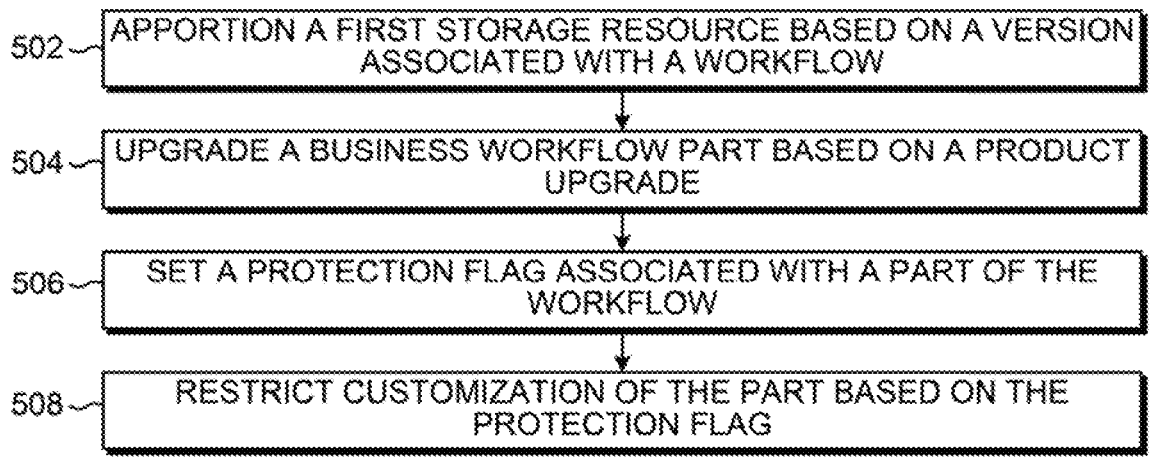
FIGS. 5-7 are flow diagrams depicting example methods of workflow customization consistent with disclosed examples.
Figure 6:
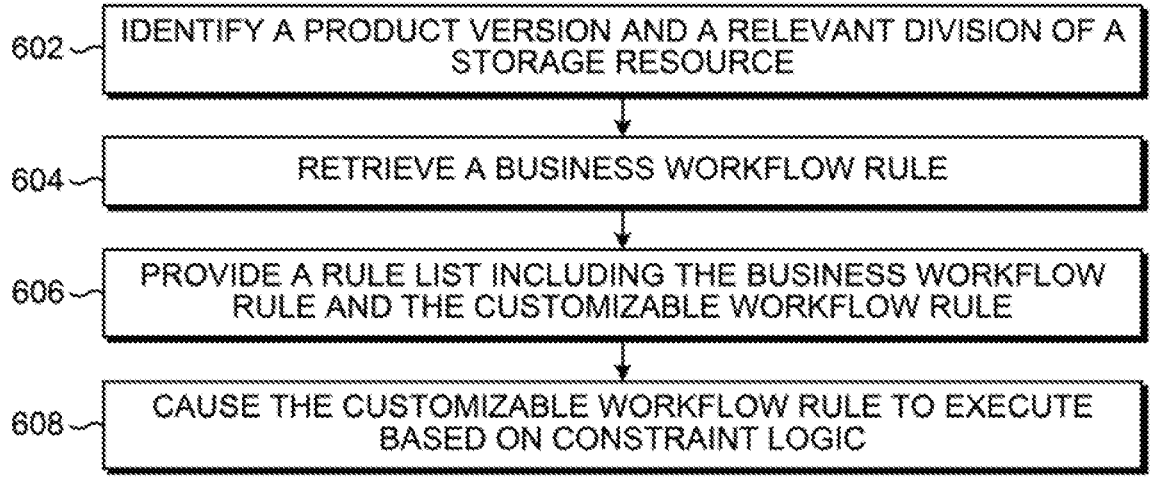
Figure 7:
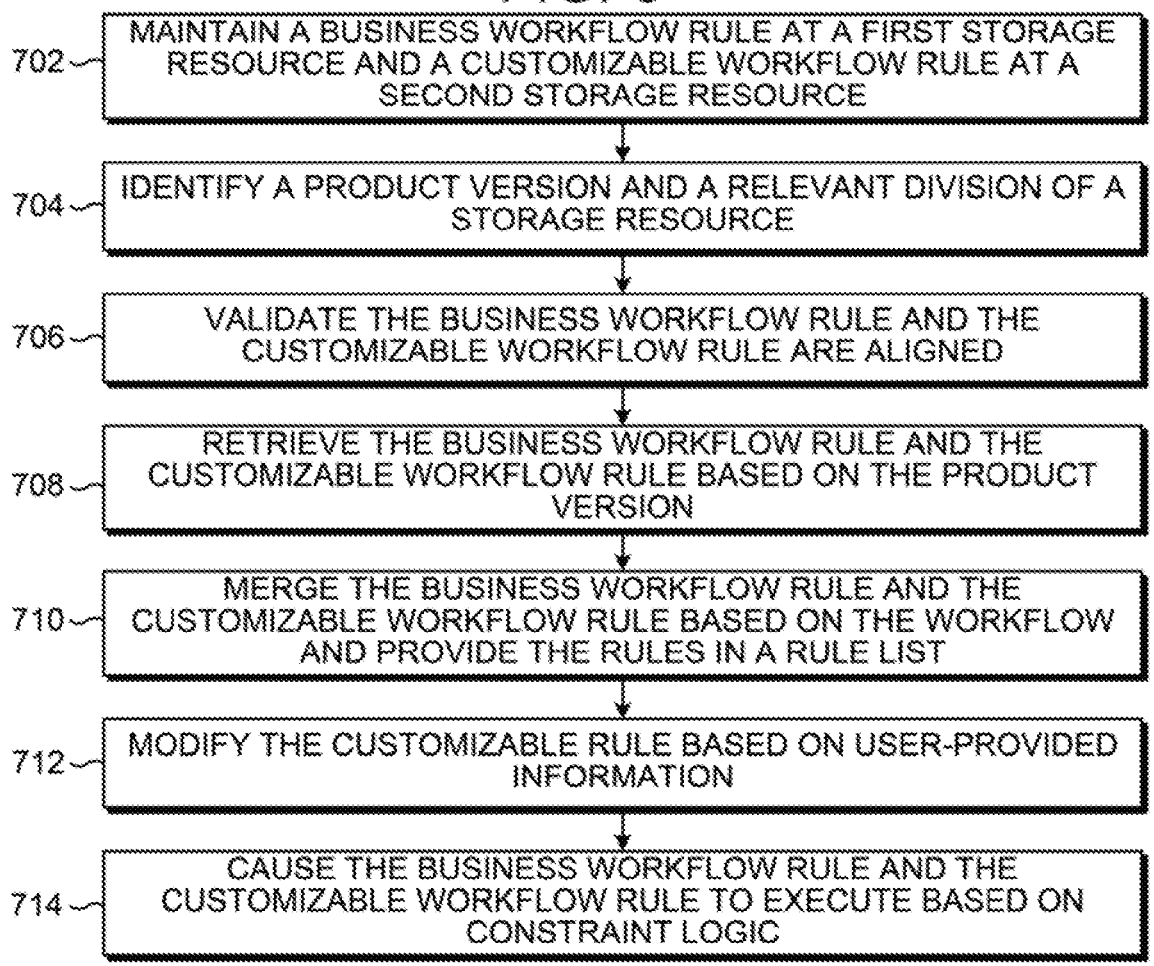

FIGS. 5-7 are flow diagrams depicting example methods of workflow customization consistent with disclosed examples. Referring to FIG. 5, an example method of workflow customization can generally comprise apportioning storage resources, upgrading workflow parts, setting a protection flag associated with a workflow part, and restricting customization of a workflow part based on the protection flag.

At block 502, a first storage resource is apportioned based on a product version associated with a workflow to be maintained. For example, the first storage resource can be apportioned into multiple segments based on the number of support versions of a workflow management product. For another example, a request workflow that is not compatible with a first set of business workflow parts can retrieve a second set of business workflow parts instead. The first storage resource can be apportioned based on an order of execution, a workflow part class, and a product version.

At block 504, a business workflow part is upgraded based on a product upgrade. Maintaining parts of the workflow in layers allows for the upgrade to avoid errors in compatibility between upgraded versions of the workflow management application. In this manner, when a tenant decides to upgrade to a different version of the offered workflow management product, the business rules associated with the upgraded version can be retrieved rather than the older version and the customizable rules can continue to function appropriately.

At block 505, a protection flag is set. A protection flag represents whether a part has read-only capability or read-write capability. A protection flag is associated with a part of the workflow. For example, each workflow part can be designated with a protection flag to denote the customization state. For another example, a subset of a list of rules can be designated with an active protection flag and identified as read-only rules while the rules with an inactive protection flag can be identified as customizable rules. Thus, when a user tries to customize a workflow part, the user can be restricted from customizing a part of the workflow based on the protection flag at block 508.

FIG. 6 depicts blocks and details of workflow customization generally regarding identifying a product version, identifying a relevant division of a storage resource, retrieving a business workflow rule, providing a rule list, and causing a customizable workflow rule to execute.

At block 602, a product version and a relevant division of a storage resource are identified. For example, an identification engine, such as identification engine 114, determines the product version of an application to host a workflow by parsing a request for the workflow, user-provided data, constraint logic, or other data (e.g. metadata) associated with workflow management product. Using the product version, a relevant division of a storage resource can be identified. For example, a plurality of business rule sets may be organized in a first storage resource and the location of the appropriate business rule set may be selected based on the business rules associated with the workflow and the product version.

At block 604, a business workflow rule can be retrieved based on the identified division of the storage resource. The business workflow rule can be associated with a state (e.g. a phase) of the workflow. The business workflow rule can be part of a set of rules for fulfilling the state of the workflow. The storage resource can be apportioned based on storage type and retrieval of the rule can be based on the storage type. For example, the read-only rules to execute a version of the product can be kept in a file system associated with the product and the customizable rules can be stored in a centrally-managed database.

At block 606, a rule list can be provided that includes the business workflow rule and a customizable workflow rule associated with the state of the workflow. In this manner, the foundational rules for accomplishing the workflow can be provided separately from the workflow rules that accomplish the customized actions of the workflow; the layered organization provides the customizable rules in a selectable and editable form for a user while the business rules are provided in a presentation form without editing capability. A user can modify the customizable rules or accept the default customizable rules provided by the workflow management product. The customizable workflow rule can be caused to execute in an order provided by constraint logic at black 608. For example, the constraint logic can designate that the business rules for entering a phase may be executed first, the customizable rules executed second, and the business rules for leaving a phase to be accomplished last. In that example, the phase can transition to another phase when upgrading the product (e.g. upgrading the constraint logic and business rules) and allow for customization at each phase (e.g. limiting the customization to duration or middle of the phase). For another example, constraint logic can separate workflow part retrievals based on the order of the layers of the workflow and the list order can be based on the retrieval order, which is predetermined by the constraint logic.

FIG. 7 includes blocks similar to blocks of FIG. 6 and provides additional blocks and details. In particular, FIG. 7 depicts additional blocks and details generally regarding maintaining rules in storage resources, validating the rules, merging the rules, and modifying the customizable rules. Blocks 704, 708, 710, and 714 include the similar method details as blocks 602, 604, 606, and 608 of FIG. 6 and, for brevity, their respective descriptions have not been repeated in their entirety.

At block 702, a business workflow rule is maintained at a first storage resource and a customizable workflow rule is maintained at a second storage resource. The rules can be separated into resource based on the layers of the workflow (e.g. the customizable layer and the read-only layer). The rules are to be maintained on separate storage resources to provide the workflow management product to offer business rules for multiple tenants and flow for each tenant to retain the customization rules in a separate resource. Each storage resource can be organized in a manner to facilitate retrieval and merger of the rules. For example, as described herein, the first storage resource can be organized based on product version with relevant divisions of the storage resource housing parts associated with a selected workflow.

The storage resources can be maintained based on a flag and an order. The flag can identify the status of customization of the rule with which the flag is coupled. For example, a business workflow rule can be maintained at a first storage resource based on a first protection flag coupled with the business workflow rule and a customizable workflow rule at a second storage resource based on a second protection flip coupled with the customizable workflow rule. The order of the workflow parts at each storage resource can indicate the order of execution of the workflow parts.

At block 706, the business workflow rule and the customizable workflow rule identified at the storage resource at block 704 are validated for alignment. The business workflow rule and the customizable workflow rule are validated for alignment with each other and/or the product version to host the workflow. Alignment can be based on the product version, the constraint logic, and/or the workflow. A valid business workflow rule and a valid customizable workflow rule are retrieved from their locations on the storage resources based on the product version at block 708.

At block 710, the business rule and the customizable workflow rule are merged. The rules can be merged into a list and the order of the list can be based on constraint logic of the workflow. For example, the business rule and the customizable rule can be combined based on the state of the workflow and the version of the product. The constraint logic can determine whether the customized rule should be ordered before or after the read-only rule based on the functionality associated with the workflow, such as the server hosting the workflow or application for providing the workflow. Such functionality may be required for each execution of the workflow (or variation) and rules based on that functionality should be restricted from being altered to ensure expected performance of the functionality. The order of the rules can be predetermined, such as based on a saved order of read-only rules and default customizable rules for a workflow.

When a user selects a workflow to use, default workflow parts can be provided. For example, the read-only business rules for a phase are provided to ensure proper functionally of the workflow as well as default customizable rules for the phase. Rules can also be added to the default rules. Added rules may be customizable or read-only based on the class of rule. An added rule can be added to a list of rules based on constraint logic. For example, the rule can be restricted from being placed in a non-customization section of the list. In that example, the constraint logic is defined by a data structure designating a customizable section of the list. A customizable section of the list can allow a user to reorder the customizable rules in any order, such as by adding, updating, or moving a customizable rule. The order of rules that could affect the process completion, such as rules based on server or application functionality, can be separated from the customizable section.

Whether a default rule or an added rule, a customizable rule can be edited, such as via a customization engine 108 of FIG. 1, and the user-provided edits carp be used to modify the customized rule at block 712. The customized rule can be modified based on constraint logic and/or user-provided information, such as user input or a user profile. A rule modification can include changing the condition, of the rule, the result of the rule, and/or reordering the rule in the list. For example, the user can reorder the customizable rules and the resource storing the customizable rule can be maintained appropriately (e.g. the storage resource can be reordered via a storage engine 104). The user may also accept the default custom rules. For example, the business rule default can be provided based on a subject matter expert's knowledge of the industry and the average workflows created by customers of the industry. Default custom rules can change based on a product upgrade and the customizable rule can be modified based on the upgrade of business logic defaults (e.g. restricted business rules and constraint logic associated with the upgraded product version). Separating workflow parts (e.g. the rules) into layers based on customization as determined by constraint logic allows for the business workflow parts to be replaced separate from customization workflow parts. In this manner, the business workflow parts and the customizable workflow parts can be caused to execute successfully before and after the upgrade.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples, it is understood, however, that other forms, details, and examples may be made without departing from the spirit and scope of the following claims.

What is claimed is:

1. A system comprising:
 a processor; and
 a non-transitory storage medium storing instructions executable on the processor to:
  maintain a restricted workflow part on a first storage resource, the restricted workflow part being associated with a first product version of a product that manages a workflow comprising the restricted workflow part;
  maintain a customizable workflow part on a second storage resource, the workflow managed by the first product version of the product further comprising the customizable workflow part;
  in response to an upgrade of the product from the first product version of the product to a second product version of the product, upgrade the restricted workflow part separately from the customizable workflow part;
  after the upgrade of the product, retrieve the upgraded restricted workflow part based on the second product version of the product;
  merge the upgraded restricted workflow part with the customizable workflow part into an updated workflow managed by the second product version of the product, wherein the upgraded restricted workflow part comprises a first collection of process tasks, and the customizable workflow part comprises a second collection of process tasks, and the merging of the upgraded restricted workflow part with the customizable workflow part into the updated workflow managed by the second product version of the product comprises merging the first collection of process tasks and the second collection of process tasks into the updated workflow managed by the second product version of the product; and
  cause execution, in a computing environment, of the updated workflow managed by the second product version of the product on a server computer.

2. The system of claim 1, wherein the instructions are executable on the processor to:
 facilitate customization of the customizable workflow part and restrain customization of a workflow rule having a restricted status; and
 cause presentation of an identifier to identify the customizable workflow part as customizable.

3. The system of claim 1, wherein the instructions are executable on the processor to:
 cause presentation of an identifier to identify the restricted workflow part as restricted from customization.

4. The system of claim 1, wherein the upgraded restricted workflow part further comprises a first collection of workflow rules, wherein the customizable workflow part further comprises a second collection of workflow rules, and wherein the merging of the upgraded restricted workflow part with the customizable workflow part further comprises merging the first collection of workflow rules and the second collection of workflow rules into the updated workflow.

5. The system of claim 4, wherein the first collection of workflow rules is restricted from customization and is associated with functionality of the server computer or a functionality of a program executed on the server computer, and wherein the second collection of workflow rules is customizable and associated with a tenant of the system.

6. The system of claim 1, wherein the restricted workflow part is upgraded with the upgrade of the product without affecting a customization of the product based on the customizable workflow part.

7. The system of claim 1, wherein the updated workflow comprises actions performed based on a condition, the actions being part of a service provided by the server computer.

8. The system of claim 1, wherein the restricted workflow part is restricted from customization.

9. The system of claim 1, wherein the instructions are executable on the processor to:
validate the customizable workflow part to determine compatibility with the second product version of the product produced by the upgrade of the product; and
place the upgraded restricted workflow part and the customizable workflow part in an order in the updated workflow based on constraint logic.

10. A non-transitory computer readable storage medium comprising instructions executable by a processor resource to:
maintain a restricted workflow part on a first storage resource, the restricted workflow part being associated with a first version of a workflow management product that manages a workflow comprising the restricted workflow part;
maintain a customizable workflow part on a second storage resource, the workflow managed by the first version of the workflow management product further comprising the customizable workflow part;
in response to an upgrade of the workflow management product from the first version to a second version, upgrade the restricted workflow part separately from the customizable workflow part;
store the upgraded restricted workflow part in the first storage resource;
after the upgrade of the workflow management product, retrieve, from the first storage resource, the upgraded restricted workflow part based on the second version of the workflow management product;
merge the upgraded restricted workflow part with the customizable workflow part into an updated workflow managed by the second version of the workflow management product, wherein the upgraded restricted workflow part comprises a first collection of process tasks, and the customizable workflow part comprises a second collection of process tasks, and the merging of the upgraded restricted workflow part with the customizable workflow part into the updated workflow comprises merging the first collection of process tasks and the second collection of process tasks into the updated workflow; and
execute, in a computing environment, the updated workflow that is managed by the second version of the workflow management product on a server computer.

11. The non-transitory computer readable storage medium of claim 10, wherein the upgraded restricted workflow part further comprises a first collection of workflow rules, and the customizable workflow part further comprises a second collection of workflow rules, and wherein the merging of the upgraded restricted workflow part with the customizable workflow part further comprises merging the first collection of workflow rules and the second collection of workflow rules into the updated workflow.

12. The non-transitory computer readable storage medium of claim 11, wherein the instructions are executable by the processor resource to:
order, according to a constraint logic, workflow rules of the first collection of workflow rules and the second collection of workflow rules in the updated workflow.

13. The non-transitory computer readable storage medium of claim 10, wherein the instructions are executable by the processor resource to:
set a plurality of flags to identify that the upgraded restricted workflow part is restricted from customization and the customizable workflow part is allowed to be customized; and
identify the upgraded restricted workflow part and the customizable workflow part based on the plurality of flags.

14. The non-transitory computer readable storage medium of claim 10, wherein the instructions are executable by the processor resource to:
validate the customizable workflow part to determine compatibility with the upgraded restricted workflow part.

15. The non-transitory computer readable storage medium of claim 10, wherein the restricted workflow part is upgraded to the upgraded restricted workflow part without affecting a customization of the workflow management product based on the customizable workflow part.

16. The non-transitory computer readable storage medium of claim 10, wherein the updated workflow comprises actions performed based on a condition, the actions being part of a service provided by the server computer.

17. A method performed by a system comprising a hardware processor, comprising:
maintaining a restricted workflow part of a workflow on a first storage resource, the restricted workflow part being associated with a first product version of a product that manages the workflow;
maintaining a customizable workflow part of the workflow on a second storage resource;
in response to an upgrade of the product from the first product version to a second product version, upgrading the restricted workflow part separately from the customizable workflow part;
after the upgrade of the product, retrieving, from the first storage resource, the upgraded restricted workflow part based on the second product version of the product;
merging the upgraded restricted workflow part with the customizable workflow part into an updated workflow managed by the second product version of the product, wherein the upgraded restricted workflow part comprises a first collection of process tasks, and the customizable workflow part comprises a second collection of process tasks, and the merging of the upgraded restricted workflow part with the customizable workflow part into the updated workflow comprises merging the first collection of process tasks and the second collection of process tasks into the updated workflow; and
cause execution, in a computing environment, of the updated workflow that is managed by the second product version of the product on a server computer.

18. The method of claim 17, wherein the restricted workflow part is upgraded to the upgraded restricted workflow part with the upgrade of the product without affecting a customization of the product based on the customizable workflow part.

19. The method of claim 17, wherein the updated workflow comprises actions performed based on a condition, the actions being part of a service provided by the server computer.

20. The method of claim 17, wherein the restricted workflow part is restricted from customization.

21. The method of claim 17, further comprising:
    validating the customizable workflow part to determine compatibility with the upgraded product; and
    placing the upgraded restricted workflow part and the customizable workflow part in an order in the updated workflow based on constraint logic.

\* \* \* \* \*